W. H. ROBERTSON.
TIRE INSPECTING MACHINE.
APPLICATION FILED FEB. 23, 1917.
1,244,245.
Patented Oct. 23, 1917.
2 SHEETS—SHEET 2.
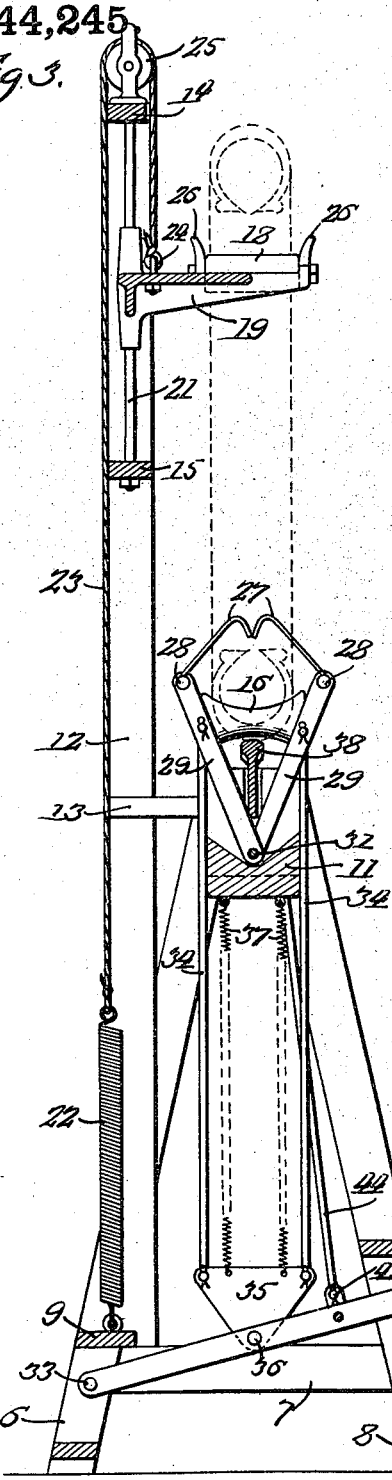
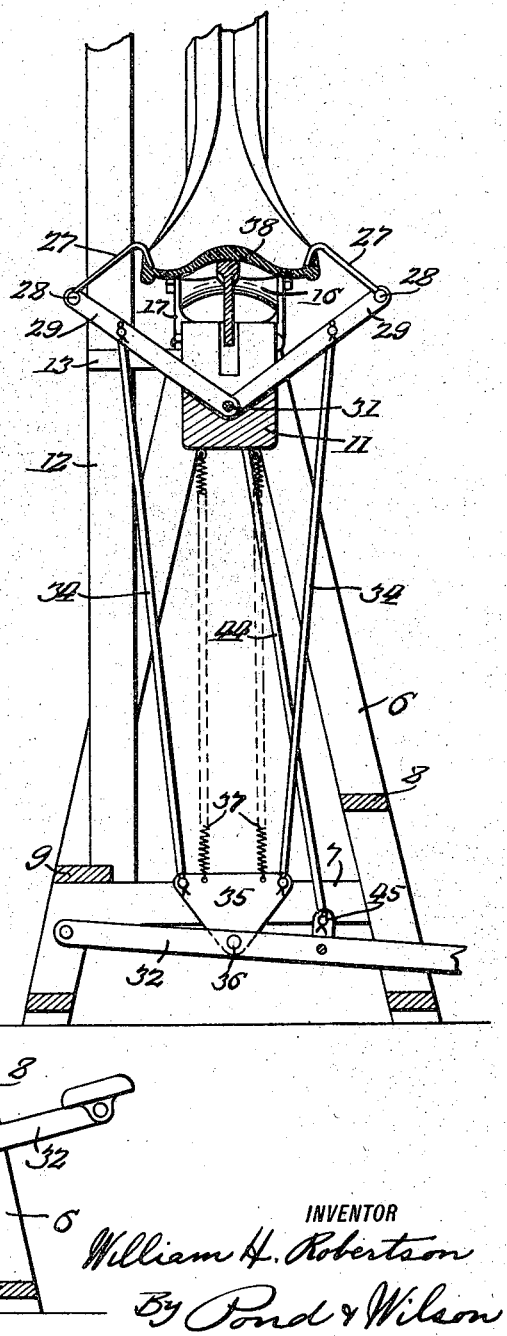
INVENTOR
William H. Robertson
By Pond & Wilson
ATTORNEYS

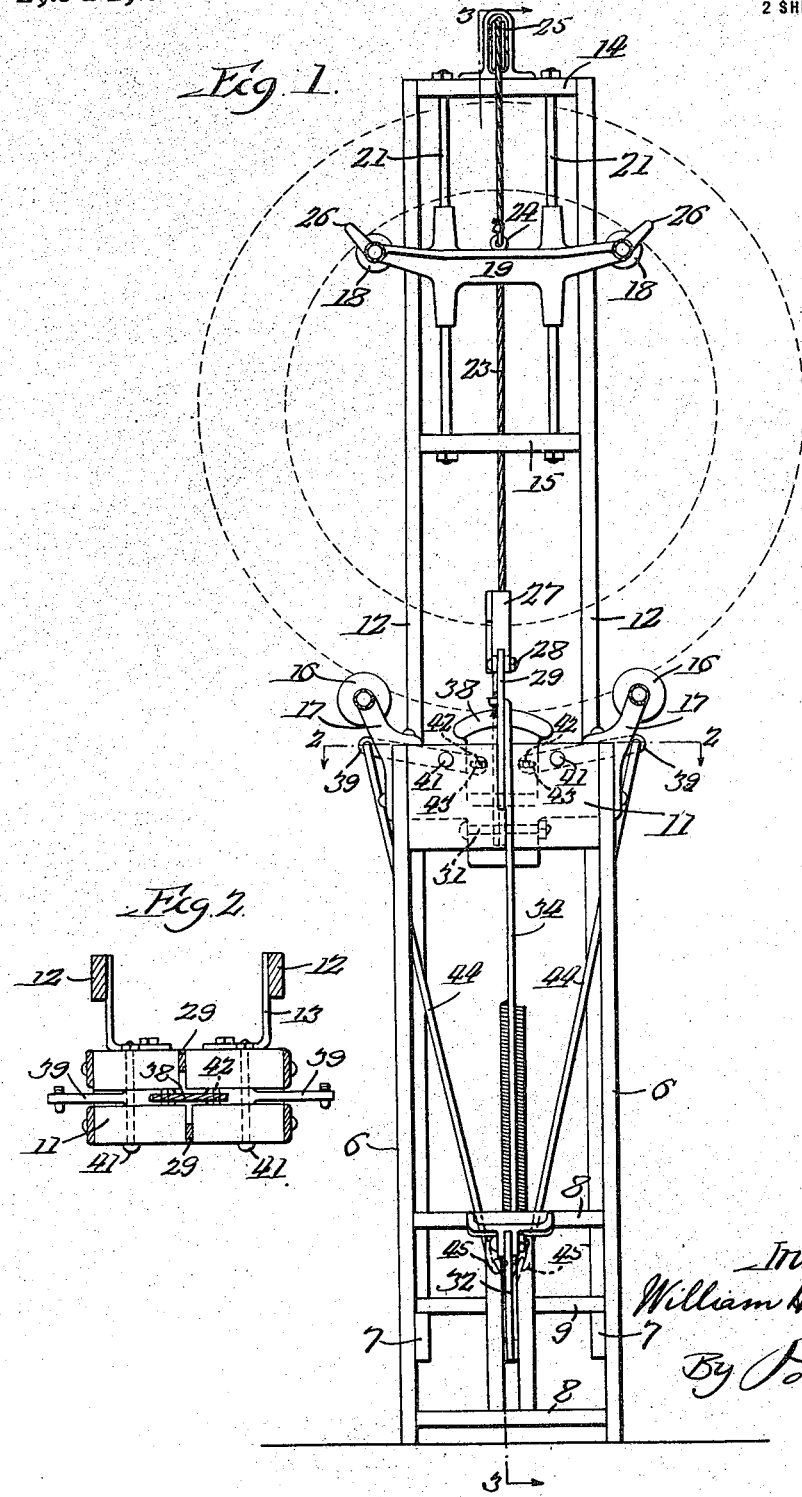

UNITED STATES PATENT OFFICE.

WILLIAM H. ROBERTSON, OF ROCKFORD, ILLINOIS.

TIRE-INSPECTING MACHINE.

1,244,245.  Specification of Letters Patent.  Patented Oct. 23, 1917.

Application filed February 23, 1917. Serial No. 150,630.

*To all whom it may concern:*

Be it known that I, WILLIAM H. ROBERTSON, a citizen of the United States, residing at Rockford, in the county of Winnebago and State of Illinois, have invented certain new and useful Improvements in Tire-Inspecting Machines, of which the following is a specification.

This invention relates in general to machines employed in connection with manufacturing and repairing pneumatic tires, especially those of either the clencher or straight-side type. When tire casings or shoes of this type have become worn or injured through usage, it is common practice to vulcanize the worn or damaged portions; and by properly vulcanizing these portions a worn casing or shoe may be rebuilt, as it were, and will be substantially as serviceable as a new casing. The badly worn portions on the outer side or tread of a casing are readily detectable, but in many instances the fabric body of the casing is broken and if this is not repaired it will soon give rise to greater injury to the surrounding body of the casing. Such breaks or imperfections caused by wear are detectable under certain conditions from the inner side of the casing, and in establishments or places where vulcanizing is done, tire casings are thoroughly inspected and all imperfections marked or chalked on the casing. These portions are then cut out and replaced by new fabric, and the whole is then vulcanized. For this purpose two men are generally required to spread a tire by hand sufficiently to allow the inner side to be inspected for detecting the imperfections. The matter of inspecting the inner side of the tire casings is also practised by tire manufacturers and each casing is inspected in substantially the same manner as described above for the purpose of detecting any breaks or imperfections in the fabric. In all instances the work can not be conveniently done, because of the lack of proper means for performing it, so that considerable time is required for thoroughly and satisfactorily inspecting the casings.

As a consequence of the conditions mentioned above I have aimed to ameliorate the difficulties of handling and inspecting tire casings by providing a machine of novel construction by means of which but one man may very quickly, easily and conveniently inspect and mark casings in a very thorough and practical manner.

In furtherance of this general object I have designed a machine which will support a tire casing of any size in upright position and will allow it to be revolved so as to move any portion past an inspecting station at which is located devices for spreading the bead portions of the tire outwardly and for bulging the intermediate tread portion inwardly in a manner to fully expose to view any imperfections or breaks in the fabric of the casing. These devices are preferably operated by foot power by the operator so that his hands are free to mark the defective parts.

Another object is to provide a machine of the character described which shall be simple in construction and operation so as to be thoroughly practical and capable of being produced at a comparatively low cost.

Other objects and attendant advantages will be appreciated by those skilled in the art as the invention becomes better understood by reference to the following description when considered in connection with the accompanying drawings, in which—

Figure 1 is a front elevation of a tire inspecting machine embodying my improvements, shown in normal position;

Fig. 2 is a horizontal sectional view taken substantially on the line 2—2 of Fig. 1;

Fig. 3 is a vertical sectional view through the machine taken substantially on the line 3—3 of Fig. 1; and Fig. 4 is a similar sectional view through the lower portion of the machine showing the parts in operated position.

My improvements are preferably mounted on a stand or frame which may be easily moved about to any location desired, but the invention is in no way limited to such an arrangement since the parts may be suitably mounted on a permanent structure or frame in connection with a wall or any other structure. In the present instance, a suitable stand is provided by legs 6 joined together at their lower ends by side braces 7 and front and rear braces 8 and 9, respectively, and rigidly secured at their upper ends to a bed portion 11. Spaced upright standards 12 secured at their lower ends to the rear legs 6, are joined by braces 13 to the bed 11 and project above the same and are joined by upper and lower braces 14 and 15, respectively.

Means are mounted on this stand or frame for supporting a tire of any size in substantially upright position and in a manner to permit the tire to be freely revolved so that any portion of the tire may be positioned directly above the bed 11, which constitutes what might be termed an inspection station. This means consists in general of a pair of spaced rollers or wheels mounted on the bed and upon which a tire is adapted to rest and be revolved. Said means also includes a pair of upper rollers or wheels or suitable guides for engaging and guiding the inner periphery or bead portion of the tire at its uppermost side so as to hold the tire in upright position and prevent it from being laterally displaced and also for guiding the tire when it is being revolved. This latter guiding means is vertically adjustable to accommodate any sized tire, and means is provided for constantly urging the upper rollers or guide means upwardly so as to be immediately accommodated to a tire of any size and to be held in proper relation thereto. The lower tire supporting means consists preferably of a pair of spaced rollers or wheels 16 supported by suitable brackets 17 mounted on the bed 11 and having a concave periphery so that a tire casing resting on the wheels will be held against displacement therefrom. The upper tire guiding means may consist of a pair of spaced rollers or wheels 18 rotatably mounted on horizontal axes on a frame 19, which in turn is mounted on the stand so as to move vertically thereon. For this purpose the frame 19 may be shaped to embrace and slide longitudinally upon a pair of guide rods 21 rigidly mounted upon and interposed between the cross braces 14 and 15 of the stand. The means for urging this roller frame upwardly may consist of a contractile spring 22 secured at one end to the base of the stand and connected at its opposite end to a cable 23 in turn connected at 24 to the frame 19 after having been run over a pulley 25 mounted on the cross brace 14. Suitable means such as ears or guides 26 at each end of the rollers 18 are provided for preventing a tire from being displaced from these rollers. By reason of this construction it will be evident that the frame 19 will be constantly urged upwardly so that the upper tire guiding means will be accommodated to any sized tire resting on the rollers 16 and will be maintained in proper coöperation therewith. The force of the spring 22 is not, however, great enough to raise a tire from the rollers 16 but is thoroughly strong enough to maintain the upper guiding means in proper position. Obviously, a tire casing resting on the supporting means in the manner described may be revolved thereon so that any portion of the tire may be moved past the inspection station.

Means are provided at the inspecting station for distorting the casing from its normal shape in a manner to permit even the slightest breaks and imperfections in the fabric and casing to be readily detectable. Such means consists in general of a pair of arms or gripping devices for engaging that portion of the casing centrally intermediate the rollers 16 and suitable mechanism for drawing these arms outwardly in opposite directions to spread the bead portions of the casing outwardly, and also of a presser foot or shoe adapted to be pressed upwardly against the tread of the casing intermediate the engaging arms so as to bulge the tread upwardly or inwardly with respect to the casing. This portion of the casing is thus spread out under considerable pressure and drawn from its normal shape in such manner as to expand the inner side of the casing so that any breaks in the fabric thereof will be opened up and will be readily detectable. The spreading means may consist of a pair of hooked arms 27 respectively pivotally connected at 28 to the ends of lever 29 pivotally mounted on a bolt 31 in turn mounted on the bed 11 centrally beneath the tire. These levers diverge upwardly from their common pivot so as to position their hooked arms on opposite sides of the tire casing, as is clearly shown in Fig. 3. The levers are adapted to be actuated by a foot lever 32 pivoted at 33 on the stand and connected to the levers through the agency of links 34 and an equalizing plate 35. The latter is pivotally mounted at 36 on the lever 32 intermediate the connection points of the links 34 with said plate, so that when the lever 32 is depressed the force transmitted through the links 34 will be equally distributed to the hooked ends 27 by reason of the action of the equalizing plate 35. A pair of contractile springs 37 connected to the equalizing plate 35 on opposite sides of its pivot and to the underside of the bed 11 serve to throw the lever 32 and consequently the levers 29 upwardly to an inoperative position. Each arm 27 may be hooked over the adjacent bead portion of a tire casing of the character described above so as to engage the inner side thereof, and upon depressing the lever 32 these arms will be drawn outwardly so as to spread the bead portions of the tire in the manner shown in Fig. 4. The presser foot may be in the form of a block 38 positioned directly beneath the tire casing centrally intermediate the rollers 16 and capable of vertical movement with respect to the bed 11. The presser foot is pivotally mounted upon the inner ends of a pair of levers 39 pivoted intermediate their ends at 41 on the bed, the pins 42 connecting the levers 39 to the presser foot being located in horizontal slots 43 in the presser foot so as to allow for the necessary play between these parts when the levers are rocked. The levers are pivotally connected at their outer ends by means of links 44 to the foot lever 32 at 45.

The operation of the tire inspecting machine is as follows: In its normal position the upper roller and guide frame is held in uppermost position by the spring 22 and the levers 24 are likewise held in their uppermost position by the springs 37, their hooked arms 27 being swung outwardly so as to permit a tire casing to be positioned on the machine. A tire casing of either the clencher or straight-side type to be vulcanized is raised by an operator and positioned over the rollers 18 so that the inner or beaded side of the tire rests on said rollers, whereupon the tire is drawn down, moving the frame therewith against the pressure of the spring 22 until the casing rests on the rollers 16. The hooked arms 27 are then swung together and respectively engaged at the inner side of the adjacent bead portions of the casing. The operator standing in front of the machine then presses downwardly on the foot lever 32 which causes the bead portions of the casing at the lowermost side thereof to be spread outwardly to their fullest extent and the intermediate tread portion of the casing to be bulged upwardly in the manner shown in Fig. 4 and as described above. The stone cuts and bruises, worn portions and other imperfections due to under-inflation and over-loading are thus revealed by the breaks in the fabric in the inner side of the casing and are fully exposed to the view of an operator who may conveniently lean forwardly so as to closely view the casing and mark or chalk the inner side thereof to designate the portions requiring vulcanizing. When the portion of the tire thus spread has been fully inspected and marked the lever 32 will be released so that the spreading arms and presser foot will return to normal position and the tire may be revolved on its support to position the next adjacent portion of the tire at the inspecting station. The operation of inspecting and marking the tire just described will then be repeated, and in similar manner the whole tire will be inspected and marked.

It is believed that the foregoing conveys a clear understanding of my improvements and the objects prefaced above, and it should be understood that while I have illustrated one working embodiment of the invention various changes and modifications might be made without departing from the spirit and scope of the invention as expressed in the appended claims:

I claim:

1. A machine for inspecting the inner surface of a tire casing, comprising a member at an inspecting station upon which the tread of the casing rests, members engageable with the bead portions of the casing at said station and offering no obstruction to a full view of the inner surface of the casing thereat, and means for moving said bead-engaging members outwardly and for causing a relative movement between these members and the first named member whereby the bead portions of the casing at the inspecting station will be spread outwardly and the intermediate tread portion will be bulged inwardly so as to expose to full view any imperfections in the inner surface of this portion of the casing.

2. In a machine for inspecting the inner surface of tire casings, means for engaging the inner surface of the opposite bead portions of the casing, means for engaging the tread portion intermediate said bead-engaged portions, and means for causing relative movement between said means for spreading the bead-engaged portions outwardly and for bulging the tread-engaged portion inwardly, said means being so arranged as not to preclude free inspection of the inner surface of the casing which is spread and bulged in the manner described.

3. A machine for inspecting the inner surface of a tire casing, including a pair of hooked arms arranged so that the hooked ends of each is freely movable into and out of coöperation with and is shaped to engage one of the bead portions of the casing at its inner side, and means for moving said arms outwardly to spread these portions of the casing.

4. A machine for inspecting the inner surface of a tire casing, including means for engaging the opposite bead portions of the casing to spread the same, and means for moving said spreading means and for equalizing the pressure applied to and for moving the same.

5. The combination of means for supporting a tire in substantially upright position, a pair of levers pivoted beneath the casing and equipped with hooked arms extending around the lower portion of the casing and adapted to respectively engage the inner side of the opposite bead portions of the casing so that when the levers are swung outwardly the bead portions will be spread apart, and means for pressing the tread of the tire upwardly intermediate the portions engaged by said hooked arms.

6. The combination of a stand equipped with a pair of spaced rollers or the like upon which a tire casing may rest in substantially upright position, vertically movable rollers or the like adapted to engage the inner side of the casing above the bottom rollers, and means mounted on said stand for engaging the inner side of the bead portions of the casing intermediate the lower rollers and for spreading these portions outwardly.

7. The combination of a stand equipped with a pair of spaced rollers or the like upon which a tire casing may rest in substantially upright position, vertically movable rollers or the like adapted to engage the inner side of the casing above the bottom rollers, means constantly urging the upper rollers in an upward direction, and means mounted on said stand for engaging the inner side of the beaded portions of the casing intermediate the lower rollers for spreading these portions outwardly and inwardly so as to hold the casing in position on the lower rollers and also to expose the inner side of the casing for purposes of inspection.

8. The combination of a frame, a pair of spaced rollers or the like upon which a tire casing may rest in upright position, a presser foot disposed intermediate said rollers beneath the casing and mounted on the frame so as to be vertically movable for pressing upwardly on the tread portion of the casing, arms for engaging the inner sides of the bead portions of the casing intermediate the rollers and being movable outwardly for spreading the casing, and means connected to said arms and presser foot for moving the latter upwardly and simultaneously moving the arms outwardly so as to spread the bead portions of the casing outwardly and to bulge the tread portion thereof upwardly.

9. The combination of a frame, means for supporting a tire casing in substantially upright position thereon, a presser foot disposed beneath the casing and capable of vertical movement with respect to the frame, a pair of arms each of which is adapted to engage the inner side of a bead portion of the casing adjacent to that portion engaged by the presser foot for moving the engaged bead portion outwardly, an operating lever, and connections between the operating lever and the presser foot and said arms whereby upon operation of the lever the arms will spread the engaged bead portions of the casing outwardly and the presser foot will bulge the tread portion of the casing upwardly.

10. A tire inspecting machine of the character described, including a pair of pivotally mounted arms each of which is adapted to engage the inner side of a bead portion of a casing and to be moved outwardly to spread the casing, an operating lever, and a connection between said lever and arms to move the latter outwardly, including means for equalizing the pressure between said arms.

11. A tire inspecting machine of the character described comprising means for supporting a tire casing, a pair of pivotally mounted levers extending from beyond the periphery of the casing toward the same on opposite sides thereof and each equipped at its end adjacent to the casing with a pivoted arm adapted to engage the inner side of the adjacent bead portion of the casing, an operating lever, and connections between said levers and the operating lever whereby said arms may be moved in opposite direction by operation of said lever to spread the engaged bead portions of the casing outwardly.

12. A tire inspecting machine of the character described comprising means for supporting a tire casing, a pair of pivotally mounted levers extending from beyond the periphery of the casing toward the same on opposite sides thereof and each equipped at its end adjacent to the casing with a pivoted arm adapted to engage the inner side of the adjacent bead portion of the casing, an equalizing member pivotally mounted thereon, and a link connection between each of the arm-equipped levers and said equalizing member so that the force of said single lever will be equally distributed to said arms for moving the same outwardly to spread the engaged bead portions of the casing.

13. A machine for inspecting the inner surface of a tire casing, comprising members engageable with the inner surface of opposite bead portions of a tire casing, a member engageable with the tread portion of the casing intermediate said engaged bead portions, and means for moving said bead-engaging members outwardly and for moving the tread-engaging member inwardly to spread the bead portions outwardly and bulge the tread portion inwardly to thereby expose to full view any imperfections in the inner surface of the distorted portion of the casing.

WILLIAM H. ROBERTSON.